April 22, 1952 G. POEHLMANN 2,594,069
BATTERY VOLTAGE SELECTOR JUMPER BOARD AND TERMINAL
BOARD FOR INDUSTRIAL TRUCK CHARGERS
Filed Feb. 28, 1948 3 Sheets-Sheet 1
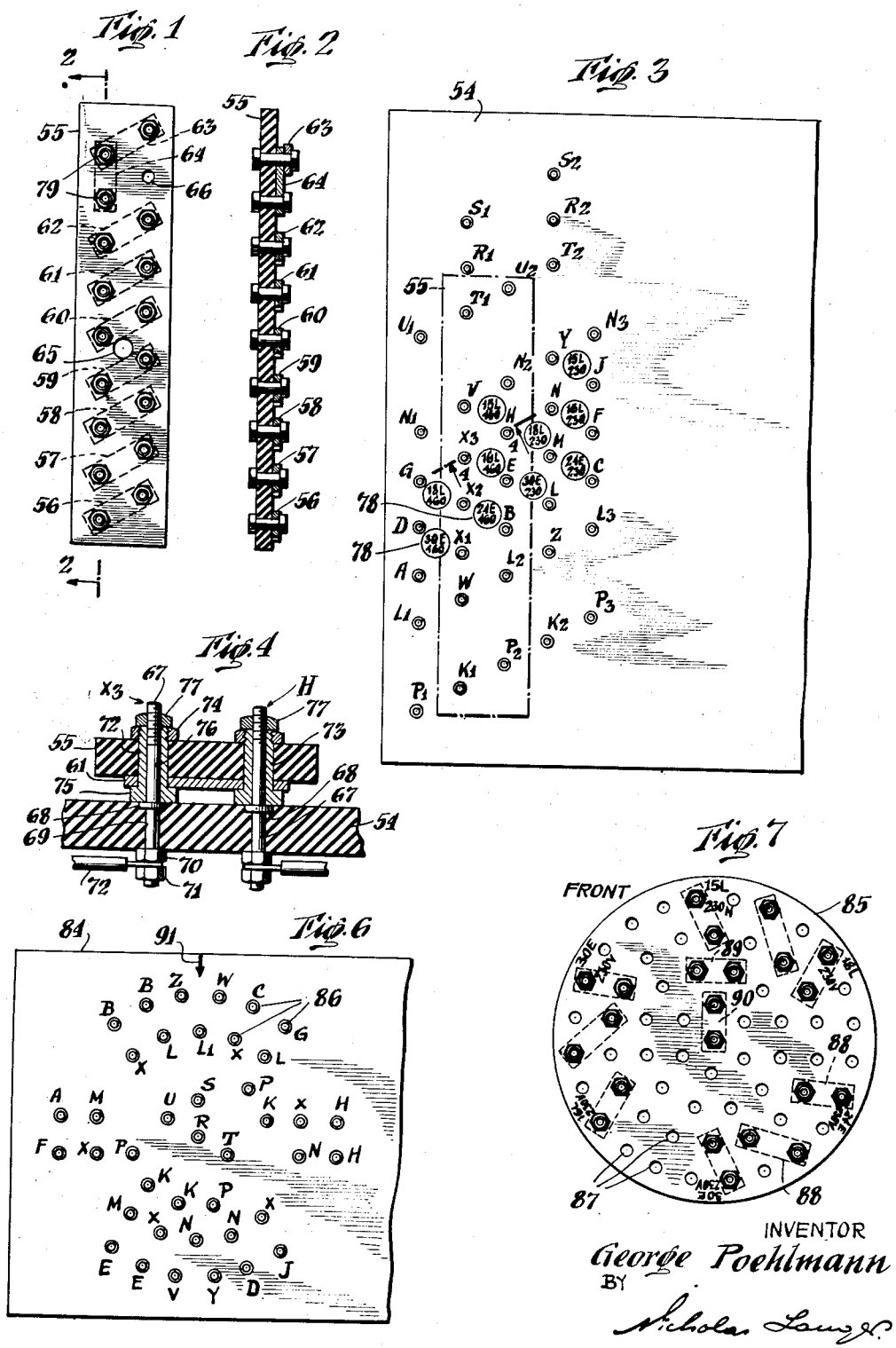
INVENTOR
George Poehlmann
BY
Nicholas Lang Jr.
ATTORNEY INVENTOR
George Poehlmann
BY
Nicholas Lang
ATTORNEY April 22, 1952      G. POEHLMANN      2,594,069
BATTERY VOLTAGE SELECTOR JUMPER BOARD AND TERMINAL
BOARD FOR INDUSTRIAL TRUCK CHARGERS
Filed Feb. 28, 1948      3 Sheets-Sheet 3
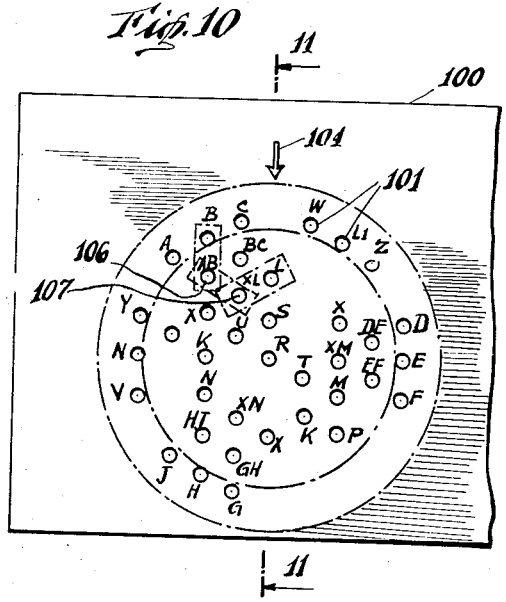
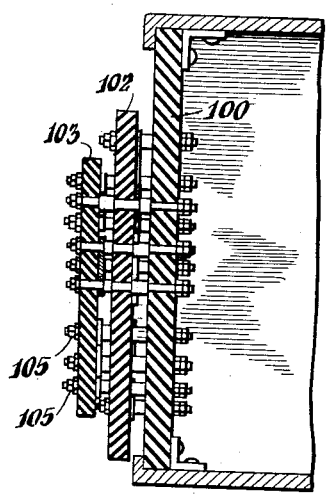
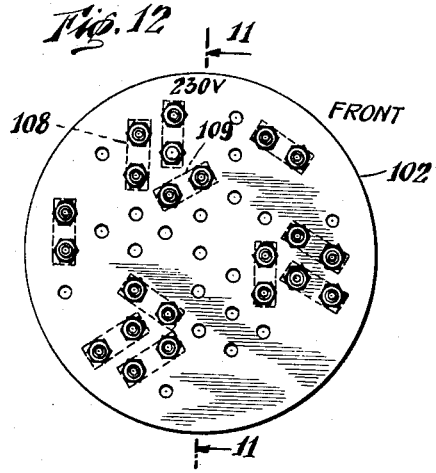
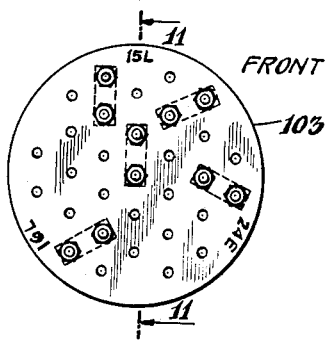
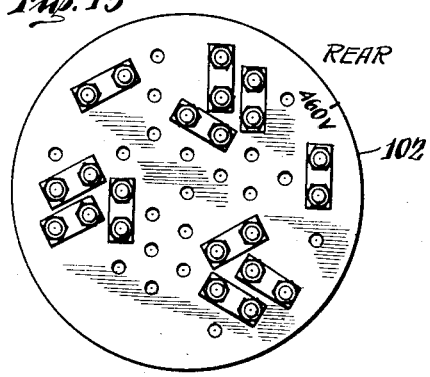
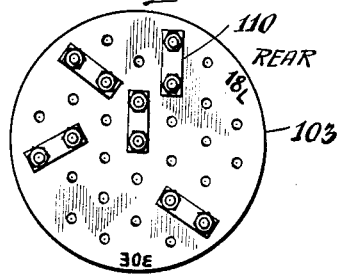
INVENTOR
George Poehlmann
BY
Nicholas Langer
ATTORNEY Patented Apr. 22, 1952

2,594,069

UNITED STATES PATENT OFFICE 2,594,069

BATTERY VOLTAGE SELECTOR JUMPER BOARD AND TERMINAL BOARD FOR INDUSTRIAL TRUCK CHARGERS

George Poehlmann, Indianapolis, Ind., assignor to P. R. Mallory & Co., Inc., Indianapolis, Ind., a corporation of Delaware Application February 28, 1948, Serial No. 11,938

1 Claim. (Cl. 173—328)

This invention relates to electric terminal boards and circuit altering devices associated therewith.

An object of the invention is to improve terminal boards and circuit altering arrangements therefor.

Another object is to provide a selector panel whereby various predetermined combinations of electrical connections can be made and altered from time to time as desired.

A specific object of the invention is to provide a battery voltage selector panel and jumper board for electric battery charging systems such as transformer-rectifier circuits for charging storage batteries from various A. C. sources.

A further object is to provide a selector panel and jumper board for an automatic battery charger which is adjustable for charging different types and sizes of batteries in a recommended and foolproof manner and to provide for simple adjustments by the user without the danger of improper connections being obtained.

Other objects of the invention will be apparent from the following description and accompanying drawings taken in connection with the appended claim.

The invention accordingly consists in the features of construction, combination of elements, and arrangement of parts as will be exemplified in the structures to be hereinafter described and the scope of the application of which will be indicated in the following claim.

In the accompanying drawings in which are shown by way of illustration several embodiments of my invention:

Figure 1 is a face view of a jumper board for making and changing circuit connections of an automatic battery charger embodying features of the present invention;

Figure 2 is a section of the line 2—2 of Figure 1;

Figure 3 is a face view of a portion of a selector panel or terminal board comprising part of an automatic battery charger, one mounting position of the jumper board being indicated in dot-and-dash lines thereon;

Figure 4 is a detail cross section on the line 4—4 of Figure 3;

Figure 6 is a face view of a modified panel;

Figures 7 and 8 are front and rear views respectively of a modified jumper board of circular shape adapted for cooperation with the panel of Figure 6;

Figure 10 is a face view of a further modified selector panel;

Figure 11 is a section of the panel on the line 11—11 of Figure 10, also showing in section, the jumper boards of Figures 12 and 14 mounted in one selected position;

Figures 12 and 13 are front and rear face views respectively of a jumper board for use with the panel of Figure 10; and Figures 14 and 15 are front and rear views respectively of an auxiliary jumper board also arranged for co-operation with the panel of Figure 10.

The present invention contemplates a novel jumper board and panel combination for making multiple electrical circuit connections in a predetermined manner by a simple and foolproof adjustment. Thus, it is contemplated that the panel and jumper board can be arranged to make several combinations of circuit connections some of which may be similar in two or more combinations, while other circuit connections are changed. Provision is made for doing this in a simple and foolproof manner so that the circuit connections may be changed by an inexperienced person without the danger of improper connections being made.

It is also contemplated that the jumper board and panel may be arranged with co-operating index members or formations so that the nature of each setting of the jumper board will be clearly indicated to the user during the setting up of the connections as well as at any subsequent time. The connections preferably may be of a permanent nature but adapted to be readily changed in a short period of time when necessary.

The invention also contemplates certain novel features of construction of the jumper board and of the panel arrangements as well as other novel features of the electrical apparatus, such as a battery charger, to which jumper board and panel arrangement are adapted.

For purpose of illustrating the objects and advantages of the present invention it will be described as applied to a rectifier battery charger system having a circuit substantially similar to that shown and described in Whitesell Patent 2,372,698, issued April 3, 1945. The circuit shown herein as Figure 5 is substantially similar to the circuit of the Whitesell patent, certain minor differences being brought out in the following detailed description.

The system shown and described in the above-mentioned Whitesell patent is arranged for charging both lead and Edison type storage batteries from a three-phase A. C. source. The circuit shown in Figure 5 herein may be considered an improvement upon the circuit shown in the Whitesell patent in that it is adapted for use with either 230 volt or 460 volt A. C. sources and is adaptable for charging three types of lead batteries, namely 18 cell lead, 16 cell lead and 15 cell lead batteries, from either of the A. C. sources and is also adaptable for charging two sizes of Edison batteries, namely 30 cell Edison and 24 cell Edison from either voltage source.

According to one aspect of the present invention the system is adapted for the available voltage source and the battery to be charged by adjusting the jumper board and panel arrangements shown, one form of which is illustrated in Figures 1 to 4 inclusive, another form of which is illustrated in Figures 6 to 9 inclusive; and a third form of which is illustrated in Figures 10 to 15 inclusive.

Figure 5:
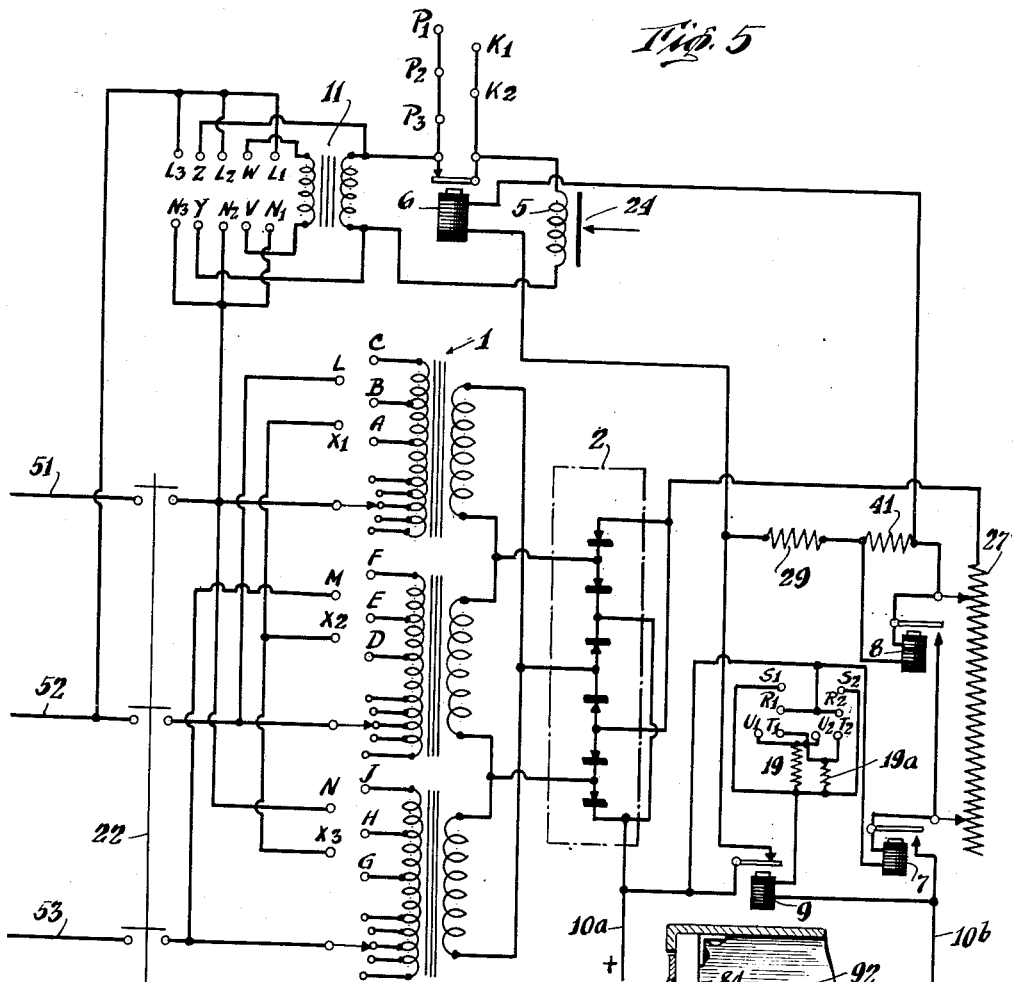
Figure 5 is a circuit diagram showing a battery charger circuit which may be associated with the panel of Figure 3.

Before describing the detailed construction and operation of the jumper board and panel arrangement it may facilitate an understanding of the invention to refer briefly to the circuit shown in Figure 5, a more detailed description of the operation of which may be obtained from the above-mentioned Whitesell patent. The circuit of Figure 5 comprises, in general, a three phase transformer 1, supplied with current from three conductors 51, 52 and 53 connected to an A. C. line. A full-wave rectifier 2 is connected to the output terminals of transformer 1 and the direct current from the rectifier is supplied to battery charging terminals 10a and 10b. A suitable regulating system is provided including a timer 5 whose contacts 24 control the closing of main line switch 22, a timer control relay 6, battery disconnect relay 7, a finish rate relay 8 and a temperature compensated voltage relay 9, all as more fully described in the above-mentioned Whitesell patent.

Due to differences in their construction and the mode of operation, lead batteries and nickel-alkaline batteries, such as Edison batteries, require different methods of charging. The lead batteries require a high initial charging rate approximately equal to 25 amperes for each 100 ampere-hours of battery capacity and a finish rate of approximately 5 amperes for each 100 ampere-hours of capacity. The Edison or nickel-alkaline batteries, on the other hand, require a relatively high charging rate of constant value throughout the charging period.

The jumper board and terminal panel assembly provides a ready and convenient means for adapting the circuit to the available A. C. voltage and the type and voltage of the battery to be charged. The jumper board carries a series of copper bridging pieces or jumpers and the panel is provided with suitably positioned conductive terminal posts over which the jumper board is adapted to be mounted in order to electrically connect certain of the posts. The terminal posts are connected in the circuit to be controlled, such as the circuit of Figure 5. Thus, in Figure 5 each of the terminals indicated by reference letters A, B, C, D, E, F, G, H, J, $K_1$, $K_2$, L, $L_1$, $L_2$, $L_3$, M, N, $P_1$, $P_2$, $P_3$, $R_1$, $R_2$, $S_1$, $S_2$, $T_1$, $T_2$, $U_1$, $U_2$, V, W, $X_1$, $X_2$, $X_3$, Y, Z appear on a panel board such as board 54 shown in Figure 3. These are arranged to be connected by a jumper board 55 which is adapted to be mounted on terminal board 54 in any one of several mounting positions. The mounting position is selected by the operator to correspond to the operating conditions such as the voltage of the A. C. source used, the number of cells in the battery to be charged and the type of battery, such as lead or Edison, which is to be charged. Jumper board 55 carries a series of jumpers 56 which are adapted, when the jumper board is mounted on the terminal board, to connect together in pairs certain of the terminals. Thus, when a higher voltage A. C. source is used, such as a 460 volt source, the jumpers are arranged to connect terminals $X_1$, $X_2$, and $X_3$, to adapt the transformer to deliver substantially the same secondary voltage to rectifier 2 from a 230 volt A. C. source as from a 460 volt A. C. source.

Timer 5, which is driven by alternating current, is adapted by the jumper board to receive its A. C. supply directly from A. C. conductors 51 and 52 when a 230 volt A. C. supply is used, but when the circuit is connected to a 460 volt supply the indicated mounting of the jumper board provides for connecting timer 5 to the A. C. supply through voltage reducing transformer 11.

When lead batteries are charged it is generally preferable to charge them at a high initial charging rate and finish at a lower rate when the battery voltage has increased to a predetermined value. It will be evident, of course, that this voltage will depend upon the number of cells of the battery and hence voltage relay 9 must be adapted to the battery being charged. The jumper board contacts also provide for this adjustment. For example, in the jumper board mounting position for batteries having the smallest number of cells, such as a 15 cell lead battery, the voltage relay 9 is connected directly across the battery terminals by a jumper member 56 connected between terminals $R_1$ and $S_1$. When higher voltage batteries are being charged the jumper board is set in a position to connect either resistance 19 or resistance 19a in series with the relay to insure its operation at substantially the same point in the charging cycle for each size of battery.

When the Edison-type batteries are charged the voltage relay is not generally used and provision is made on the jumper board to connect terminals $P_1$, $P_2$, or $P_3$ and $K_1$ or $K_2$ when the board is set for charging any of the Edison-type batteries thereby taking the timer 5 out of the control of voltage relay 9 and timer control relay 6. Hence in charging the Edison-type batteries the timer starts operating as soon as the main charging switch 22 is closed and continues operating until the charging period is completed.

Referring more specifically to Figures 1, 2 and 3 in which one terminal board and jumper board construction embodying features of the invention is illustrated, the terminal board 54 may comprise a plate or sheet of insulating material such as phenol-formaldehyde resin, hard rubber, ceramic material or the like, mounted in a suitable accessible position on the electrical apparatus, such as the transformer-rectifier circuit shown in Figure 5 for charging storage batteries. Terminals A to Z are mounted in holes drilled in panel 54 as shown more clearly in the detail view of Figure 4 in which a cross section of a portion of panel 54 and of jumper board 55 is shown together with terminals $X_3$ and H mounted in panel 54. Each terminal comprises a metal post 67 having an integral flange 68 thereon which sets in a recessed step in panel 54 surrounding the mounting hole 69, in which the terminal is mounted. A standard machine screw can also be used. Both ends of post 67 are threaded and the portion of the post behind panel 54 carries a nut 70 which secures the terminal tightly to the panel. A second nut 71 is also threaded on to the rear end of terminal post 67 to secure a conductor 72 to the terminal in order to connect the terminal into the circuit.

Terminals A to Z are arranged in a predetermined pattern on panel 54 and in the form illustrated in Figure 3 the terminals are arranged in five vertical rows and so spaced as to align themselves in nine cross-rows, which may, if desired, be slanting, as shown to conserve space on the panel board. It will also be observed by reference to Figure 5 that in some cases two or more of the terminals are connected together, such as terminals $S_1$ and $S_2$, also terminals $L_1$, $L_2$, and $L_3$; the latter also being connected to terminal L when switch 22 is closed.

Jumper board 55 has jumpers 56 to 64 inclusive mounted thereon in a vertical column, each jumper being mounted in a slanting position corresponding to the slope of the rows of terminals on board 54. Referring again to Figure 4 it will be observed that jumper 61, which is typical, is a flat strip of copper which is clamped against the under side of jumper board 55 by a pair of threaded bushings or sleeves 72 and 73. Each sleeve is threaded at its upper end and extends through aligned apertures in jumper board 55 and jumper 61. Each sleeve has a head flange 75 at its inner end and carries a nut 74 on its threaded outer end, these nuts being tightened against the upper face of board 55 to firmly clamp the head flange 75 against the jumper and clamp the jumper to the terminal board. Sleeves 72 and 73 have central openings 76 which are spaced the same distance apart as each adjacent pair of terminals in any of the slanting rows of terminal board 54. It is thus possible to mount jumper board 55 on the terminal board by simply aligning the openings in the sleeves with the desired vertical rows of terminals and sliding the sleeves on to the terminals until the jumper board is in the position shown, for example, in Figures 3 and 4. Clamping nuts 77 are threaded on to the outer end of each terminal post 67 and tightened down against the outer ends of the sleeves, such as sleeves 72 and 73, to clamp jumper board securely in place and also to insure good electrical contact between the outer ends of the sleeves and nuts 77 and the inner ends of the sleeves and flanges 68. When so mounted the jumper board completes the circuit connections of the circuit in Figure 5 for a predetermined A. C. voltage and a predetermined type and size of battery.

In order to enable the user to make the required adjustment without error and to enable him to determine at any time the setting of the apparatus, an index aperture 65 is provided in jumper board 55 and a series of index markings 78 are provided on the face of panel 54. When the operator desires to adjust the circuit for a given set of conditions it is simply necessary for him to mount the jumper board on the panel in such a position that the desired index marking 78 appears through hole 65. Thus in the mounting position shown in Figure 3 the index marking may read "24E, 460V" indicating that the circuit is set for charging a 24 cell Edison battery from a 460 volt A. C. source. It will be observed that in this mounting position the jumpers connect certain of the terminals in the second and third column of the terminal board. Starting at the top of the board it will be noted first that terminals $S_1$ and $R_1$ are above the end of the jumper board and hence are not connected. However, jumper 63 connects terminals $T_1$ and $U_2$ together. By reference to Figure 5 it will be noted that when an Edison-type battery is to be charged, voltage relay 9 is not used. The connection $T_1$—$U_2$ performs no function. At this time there is no connection to either of terminals $R_1$ and $R_2$ which would be necessary to provide an energizing circuit to relay 9.

Referring again to Figure 3 it will be noted that terminals $L_2$ and $N_2$ are connected respectively to terminals W and V thereby providing an energizing circuit for timer 5 through transformer 11 as is necessary when a 460 volt A. C. supply is used. Terminals B, E and H are connected respectively to terminals $X_1$, $X_2$, and $X_3$ thereby connecting transformer 1 for operation over a 460 volt supply. With these connections it will be noted that current from supply conductor 51 passes through the upper section of the transformer primary winding and then via terminals $X_1$, $X_2$, and $X_3$ through the second and third windings in parallel.

Jumper 56 in this setting connects together terminals $K_1$ and $P_2$, thus effectively taking the control of timer 5 away from timer control relay 6 to prevent any accidental interference with the operation of the timer should relay 6 be operated fortuitously.

If it is desired to charge a 15 cell battery from a 230 volt A. C. source the operator will make the necessary adjustment by removing jumper board 55 and replacing it over the terminals of the fourth and fifth columns on panel 54 in the uppermost position so that the index insignia "15L, 230" is displayed through index window 65. In this position, jumper 64, which is mounted in a vertical position between the left hand end of slanting jumper 63 and the mounting sleeve 79, mounted in the second left hand position from the top of jumper board 55 connects terminals $S_2$ and $R_2$ together. By reference to Figure 5 it will be noted that this completes an operating circuit for relay 9 directly across terminals $10a$ and $10b$ of the battery being charged. Terminals Y and $N_3$ and Z and $L_3$ are also connected together in this setting to supply operating current to timer 5 directly, without using transformer 11. Connections are also set up by this adjustment to connect terminals L, M and N to transformer terminals C, F and J to adapt the transformer to 230 volt operation. In this setting it will be evident that current from supply conductor 51 after passing through the upper winding of transformer 1 returns to conductor 52 directly.

While other settings of the jumper board will not be described in detail it may be observed that when the jumper board is set for operating on higher voltage lead batteries either resistance 19 or $19a$ is connected in series with relay 9 to increase the operating voltage of the relay. Thus, in the setting for a 16 cell lead battery, terminals $R_2$ and $T_2$ are connected together to insert resistance $19a$ in the relay circuit. When an 18 cell lead battery is to be charged, requiring the mounting of jumper board 55 over the third and fourth columns of terminals on panel 54, jumpers 63 and 64 function together to connect terminal $R_2$ to terminal $U_2$ to include resistance 19 in series with the relay. It will also be noted that in any of the settings for charging lead cells there is no connection provided between terminal $P_1$, $P_2$ or $P_3$ and terminal $K_1$ or $K_2$. Hence timer control relay 6 is effective to prevent operation of timer 5 until operation of voltage relay 9 by the increased voltage of the battery as it nears charged condition, opens the energizing circuit for relay 6 and allows its armature to close the circuit for timer 5 to permit it to time the finish charging of the lead battery.

Figure 8:
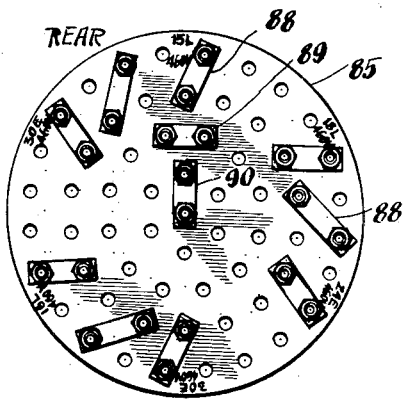

Figures 6, 7 and 8 illustrate another modification of the invention in which a circular jumper board 85 is used in cooperation with a terminal panel 84 in which the terminals 86 are mounted in circles about a common center. It will be noted that jumper board 85, shown in front view of Figure 7 and rear view in Figure 8 is drilled with a series of spaced holes 87 arranged in concentric circles of the same spacing as terminals 86. Terminals 86, however, are not located in all positions, whereas holes 87 are uniformly spaced about 360° of each circle. Jumpers 88 are secured to jumper board 85 in a manner similar to that previously described to connect certain pairs of the positions determined by holes 87. Jumpers 88 connect certain positions in the outer circle with positions in the next adjacent circle. Another jumper 89 bridges two positions in the third circle from the outside and jumper 90 connects the center terminal of the board with one in the innermost circle.

The letters adjacent to terminals 86 in Figure 6 indicate circuit connections to Figure 5 in a manner similar to that previously described in connection with Figure 3.

Panel 84 is marked with an indexing mark such as arrow 91 at a distance from the central terminal R slightly exceeding the radius of jumper board 85. Jumper board 85 is marked at predetermined positions near its edge with index markings indicating the voltage of the alternating current source and the size and type of battery to be charged for each setting of the jumper board. As jumper board is arranged for mounting with either its front or rear face adjacent to terminal board 6, it will be noted that when the front face is exposed to view, as seen in Figure 7, various indexing positions for 230 volt A. C. supply are visible while when the opposite face is exposed to view, as seen in Figure 8, the settings for a 460 volt supply are visible.

In use, the operator places jumper board 85 over the terminals of panel 84 to assemble the jumper board with the terminals in the position selected. Thus, if it is desired to charge a 15 cell lead battery from 230 volt A. C. supply the jumper board will be held in the position shown in Figure 7 and placed on the terminal board so that arrow 91 points to the index marking "15L, 230V."

Should it be desired to charge the same battery from a 460 volt source the board 85 would be turned over and placed on terminal board 84 in the position shown in Figure 8. While it is not believed necessary to refer to the individual connections in detail, it will be noted that in both mounting positions described jumper 90 will connect terminals R and S to connect voltage relay 9 directly across the battery terminals without the inclusion of resistance 19 or 19a. If the jumper board is rotated through an angle and mounted with "18L" adjacent to arrow, jumper 90 will connect terminals R and U to include resistance 19 in the relay circuit.

Figure 9:
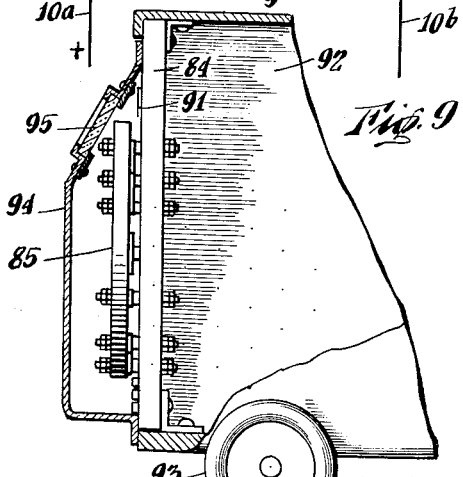
Figure 9 is a vertical section showing a portion of a portable battery charger embodying features of the present invention.

The terminal board of Figure 6 is well adapted for mounting in the electrical apparatus such as a battery charger, in a manner similar to that illustrated by Figure 9 to provide for convenient ascertainment of the setting of the jumper board through a suitable window or opening in the housing of the apparatus. Thus in Figure 9 the portable battery charger 92 which may comprise a wheeled cart having wheels 93, may have panel 84 mounted at one end and protected by a hinged door 94 provided with a small window 95 overlying arrow 91 and the edge of jumper board 85 to permit the arrow and the registering index markings on the edge of the jumper board to be viewed at all times by the operator without the necessity of opening door 94.

Figures 10 to 15 inclusive illustrate a further modification of the invention in which terminal board 100 is provided with several concentric series of terminals 101 and two jumper boards 102 and 103 are provided for mounting thereon. Both jumper boards are adapted to be mounted with either their front or rear faces forward as shown in Figures 12 and 13 for jumper board 102 and Figures 14 and 15 for jumper board 103. Jumper board 102 is of sufficient circular area to cover the entire terminal area of terminal board 100, while jumper board 103 is smaller, its periphery lying inside the outermost circular series of terminals.

In operation jumper board 102 is first mounted over the terminals in such a position that index arrow 104 points to the index marking on board 102 identifying the voltage of the power supply. Then jumper board 103 is placed over the terminals directly on top of board 102 and nuts 105 (Figure 11) are tightened down on the assembly. The index marking on jumper board 103 is also placed directly under the arrow to indicate the size and type of battery to be charged.

The two jumper boards together set up the necessary connections between terminals for the circuit setting required. The arrangement functions in part similarly to Figures 6, 7 and 8, but in this modification certain additional transfer terminals, such as terminals 106 and 107 are provided. These enable connections of two or more terminals on the one hand with a terminal selected from a group of two or more on the other hand.

The function of the transfer terminals will be clear from the following example: Assuming it is desired to set up the board for charging an 18 cell lead battery from 230 volt source, board 102 is first mounted over the terminals with "230V" adjacent arrow 104. Jumper 108 connects terminal B with terminal 106 and jumper 109 connects terminal L with terminal 107 in this position, as indicated in dotted lines in Figure 10. Jumper board 103 is then mounted directly over board 102, but with the rear face forward and the marking "18L" underneath arrow 104. Jumper 110 on board 103 will then connect terminals 106 and 107, thus completing a conductive connection between terminals B and L through transfer terminals 106 and 107 thereby setting up the transformer connection for charging an 18 cell lead battery from a 230 volt source. Other connections will be obvious from a comparison of the markings in Figure 10 with the circuit in Figure 5.

It will be seen that the present invention provides a foolproof means for setting up a complex group of predetermined connections without error on the part of the operator and without the delay and inconvenience incident to making a large number of individual changes in a circuit. The invention also provides a visual means for identifying the setting of the apparatus at any time. There is little or no possibility of error on the part of the operator since only one piece need be moved in order to make all the required changes in connections in shifting from one setting to another.

While the present invention, as to its objects and advantages, has been described herein as carried out in specific embodiments thereof, it is not desired to be limited thereby but it is intended to cover the invention broadly within the spirit and scope of the appended claims.

What is claimed is:

An electric terminal board and jumper board assembly for a circuit adaptable for charging various types and sizes of batteries comprising, in combination, a terminal board comprising an insulating panel and a plurality of spaced conductive terminals mounted thereon, said terminals being provided with conductor-attaching means, and a jumper board separably secured to said terminal board, said jumper board comprising a rectangular insulating panel smaller than said terminal board and having a plurality of indexing apertures and a plurality of fixed conductive jumpers mounted thereon, each of said jumpers having contacts at spaced points thereon for engaging a pair of said spaced terminals to connect them, said terminals being distributed on said terminal board in a predetermined pattern, and contacts being distributed on said jumper board in a plurality of different circuit patterns corresponding in part to a selected portion of said terminal pattern and in part to other portions of said terminal board pattern, said terminal board including indicating means cooperating with said indexing apertures to define a predetermined electric circuit pattern.

GEORGE POEHLMANN.

REFERENCES CITED

The following references are of record in the file of this patent:

UNITED STATES PATENTS

| Number | Name | Date |
| --- | --- | --- |
| 1,552,189 | Austrian | Sept. 21, 1925 |
| 1,892,146 | Harshberger | Dec. 27, 1932 |
| 2,056,361 | Mills | Oct. 6, 1936 |
| 2,286,812 | Keefe | June 16, 1942 |
| 2,353,061 | Oldenboom | July 4, 1944 |
| 2,431,999 | Engelhardt | Dec. 2, 1947 |
| 2,482,993 | Andersson | Sept. 27, 1949 |

FOREIGN PATENTS

| Number | Country | Date |
| --- | --- | --- |
| 223,402 | England | Oct. 23, 1924 |
| 345,492 | England | Mar. 26, 1931 |
| 367,545 | Germany | Nov. 29, 1921 |
| 617,539 | England | Oct. 5, 1946 |